(12) United States Patent
Roos et al.

(10) Patent No.: US 11,427,670 B2
(45) Date of Patent: Aug. 30, 2022

(54) COMPOSITION AND PROCESS

(71) Applicant: BOREALIS AG, Vienna (AT)

(72) Inventors: Peter Roos, Gothenburg (SE); Joy Cheng, Linz (AT); Mark Jeruzal, Scotland (GB); Qizheng Duo, Linz (AT); Erik Eriksson, Stenungsung (SE)

(73) Assignee: BOREALIS AG, Vienna (AT)

( * ) Notice: Subject to any disclaimer, the term of this patent is extended or adjusted under 35 U.S.C. 154(b) by 312 days.

(21) Appl. No.: 16/348,376

(22) PCT Filed: Nov. 15, 2017

(86) PCT No.: PCT/EP2017/079243
§ 371 (c)(1),
(2) Date: May 8, 2019

(87) PCT Pub. No.: WO2018/095772
PCT Pub. Date: May 31, 2018

(65) Prior Publication Data
US 2020/0062883 A1    Feb. 27, 2020

(30) Foreign Application Priority Data
Nov. 25, 2016 (EP) .................................. 16200682

(51) Int. Cl.
C08F 297/08 (2006.01)
C08K 3/04 (2006.01)

(52) U.S. Cl.
CPC ............ C08F 297/086 (2013.01); C08K 3/04 (2013.01)

(58) Field of Classification Search
CPC ............................ C08F 297/086; C08K 3/04
See application file for complete search history.

(56) References Cited

U.S. PATENT DOCUMENTS

| | | |
|---|---|---|
| 3,242,150 A | 3/1966 | Jacks |
| 3,324,093 A | 6/1967 | Alleman |
| 3,374,211 A | 3/1968 | Marwil et al. |
| 3,405,109 A | 10/1968 | Rohlfing |
| 4,532,311 A | 7/1985 | Fulks et al. |
| 4,543,399 A | 9/1985 | Jenkins, III et al. |
| 4,578,879 A | 4/1986 | Yokoyama et al. |
| 4,582,816 A | 4/1986 | Miro |
| 4,621,952 A | 11/1986 | Aronson |
| 4,803,251 A | 2/1989 | Goode et al. |
| 4,855,370 A | 8/1989 | Chirillo et al. |
| 4,933,149 A | 6/1990 | Rhee et al. |
| 5,026,795 A | 6/1991 | Hogan |
| 5,391,654 A | 2/1995 | Ahvenainen et al. |

FOREIGN PATENT DOCUMENTS

| | | |
|---|---|---|
| CN | 101035851 A | 9/2007 |
| CN | 103827198 A | 5/2014 |
| CN | 104854186 A | 8/2015 |
| CN | 104854187 A | 8/2015 |
| CN | 105874002 A | 8/2016 |
| CN | 105899546 A | 8/2016 |
| EP | 0047077 A1 | 3/1982 |
| EP | 250169 A2 | 12/1987 |
| EP | 188125 B1 | 5/1990 |
| EP | 372239 A2 | 6/1990 |
| EP | 479186 A2 | 4/1992 |
| EP | 499759 A1 | 8/1992 |
| EP | 560035 A1 | 9/1993 |
| EP | 579426 A1 | 1/1994 |
| EP | 600414 A1 | 6/1994 |
| EP | 683176 A1 | 11/1995 |
| EP | 699213 B1 | 2/1998 |
| EP | 684871 B1 | 5/1998 |
| EP | 0707513 B1 | 9/1998 |
| EP | 696293 B1 | 5/2000 |
| EP | 721798 B1 | 3/2002 |
| EP | 1310295 A1 | 5/2003 |
| EP | 1415999 A1 | 5/2004 |
| EP | 891990 B1 | 9/2004 |

(Continued)

OTHER PUBLICATIONS

Castignolles, et al. "Detection and quantification of branching in polyacrylates by size-exclusion chromatography (SEC) and melt-state 13C NMR spectroscopy", (2009), pp. 2373-2383.

Pollard, et al. , "Observation of Chain Branching in Polyethylene in the Solid State and Melt via 13C NMR Spectroscopy and Melt NMR Relaxation Time Measurements", Macromolecules 2004, pp. 813-825.

Parkinson, et al., "Effect of Branch Length on 13C NMR Relaxation Properties in Molten Poly[ethylene-co-(a-olefin)] Model Systems", 2007, pp. 21828-2133.

Klimke, et al., "Optimisation and Application of Polyolefin Branch Quantification by Melt-State 13C NMR Spectroscopy", MacromoL Chem. Phys. 2006, pp. 382-395.

(Continued)

*Primary Examiner* — Robert D Harlan
(74) *Attorney, Agent, or Firm* — Tarolli, Sundheim, Covell & Tummino LLP

(57) ABSTRACT

A polymer composition and a process for the production of this composition comprising a base resin is disclosed herein. The base resin includes a very high molecular weight component, a low molecular weight component, and a high molecular weight component having a weight average molecular weight higher than the weight average molecular weight of the low molecular weight component but lower than the weight average molecular weight of the very high molecular weight component. An amount of the very high molecular weight component in the base resin is 0.5 to 8 wt %. The very high molecular weight component has a viscosity average molecular weight of greater than 1100 kg/mol. The composition has $FRR_{21/5}$ of equal to or greater than 38, a melt flow rate $MFR_{21}$ of equal to or greater than 6.5 g/10 min and a viscosity at a shear stress of 747 Pa (eta747) of 450 to 3000 kPas.

15 Claims, No Drawings

(56) References Cited

FOREIGN PATENT DOCUMENTS

| | | | |
|---|---|---|---|
| EP | 1591460 A1 | 11/2005 | |
| EP | 1600276 A1 | 11/2005 | |
| EP | 1655334 A1 * | 5/2006 | ............ C08L 23/06 |
| EP | 1655334 A1 | 5/2006 | |
| EP | 1655337 B1 | 5/2006 | |
| EP | 3037436 A1 | 6/2016 | |
| EP | 3037469 B1 | 10/2017 | |
| GB | 1272778 A | 5/1972 | |
| KR | 10-2007-0065389 A | 6/2007 | |
| RU | 2425070 C2 | 7/2011 | |
| WO | 94/25495 A1 | 11/1994 | |
| WO | 94/28064 A1 | 12/1994 | |
| WO | 96/18677 A1 | 6/1996 | |
| WO | 96/19503 A1 | 6/1996 | |
| WO | 96/32420 A1 | 10/1996 | |
| WO | 00/26258 A1 | 5/2000 | |
| WO | 00/29452 A1 | 5/2000 | |
| WO | 01/05845 A1 | 1/2001 | |
| WO | 02/088194 A1 | 11/2002 | |
| WO | 2005/087361 A1 | 9/2005 | |
| WO | 2006/092378 A1 | 9/2006 | |
| WO | 2007/025640 A1 | 3/2007 | |
| WO | 2007/042216 A1 | 4/2007 | |
| WO | 2014/095911 A1 | 6/2014 | |
| WO | 2016/102062 A1 | 6/2016 | |

OTHER PUBLICATIONS

Filip, et al., "Heteronuclear decoupling under fast MAS by a rotor-synchronized Hahn-echo pulse train", Journal of Magnetic Resonance, (2005), pp. 239-243.
D. Gelart, "The design of distributors of Gas-Fluidized Beds", Powder Technology, 42 (1985) 67-78.
Lim, et al., "High-Density Polyethylene/Ultrahigh-Molecular-Weight Polyethylene Blend. I. The Processing, Thermal, and Mechanical Properties", Journal of Applied Polymer Science, vol. 97, 413-425 (2005).
James C. Randall, "A Review of High Resolution Liquid 13Carbon Nuclear Magnetic Resonance Characterizations of Ethylene-Based Polymers", C29 201, 1989.
Russian Office Action dated Feb. 11, 2020.
Office action for Korean Patent Application No. 10-2019-7008272, dated Feb. 19, 2020.
Applicant: Borealis AG; Brazilian Office Action for Application No. BR112019002951; Filed: Nov. 15, 2017; dated Aug. 13, 2021; 6 pgs.
Applicant: Borealis AG; "New Composition and Process"; Chinese Application No. 201780069383.X; Chinese Office Action; dated May 27, 2021; 21 pgs.
Applicant: Borealis AG; Chinese Application No. 201780069383.X; Chinese Office Action; dated May 6, 2022; 4 pgs.
Ma Changcheng, et al.; Urban Gas Polyethylene PE Transmission and Distribution System, China Construction Industry Press, Sep. 2006; 5 pgs.

* cited by examiner

COMPOSITION AND PROCESS

BACKGROUND OF THE INVENTION

This disclosure relates generally to a new polymer composition and a process for production of the polymer composition. Especially, the disclosure relates to a multimodal ethylene composition comprising at least three polymer components, which are a very high molecular weight polyethylene component, a low molecular weight polyethylene component and a high molecular weight polyethylene component having a weight average molecular weight higher than the weight average molecular weight of the low molecular weight polyethylene component but lower than the weight average molecular weight of the very high molecular weight component. Also the disclosure relates to an article, such as a pipe or fitting, made of the polymer composition and a use of the polymer composition for the production of the article.

Molecular weights of polymer fractions and the number of fractions may have a substantial effect on properties of polyethylene composition. The high molecular weight (HMW) component provides improved mechanical properties to the composition. The high molecular weight component's density may be less than 940 kg/m$^3$. When increasing the molecular weight of the component mechanical properties of the composition can be improved. Instead the low molecular weight (LMW) component provides good processability. The density of the low molecular weight component is typically higher than 940 kg/m$^3$.

It is well-known to add the ultra-high molecular weight (UHMW) component into the composition of the low and high molecular weight components to further improve the mechanical properties. Typically a molecular weight of ultra-high molecular weight polyethylene is greater than 3 million. The density of the ultra-high molecular weight polyethylene may be less than 935 kg/m$^3$. However, there are serious compatibility problems due to the ultra-high molecular weight component. For example, Ogunniyi et al (Journal of Applied Polymer Science, 2005, 97, 413-425) and Vadhar et al (Journal of Applied Polymer Science, 1986, 32, 5575-5584) both report the need for long blending times of the order of 15 minutes in a batch mixer when the ultra-high molecular weight polyethylene was added to other polyethylenes.

The incorporation of UHMW polyethylene into a polyethylene composition as a copolymer is also known and is reported in, for example, WO 2007/042216, WO 96/18677 and WO 2006/092378.

The inclusion of UHMW polyethylene into HDPE via extrusion has also been investigated and has been carried out using a co-rotating twin screw extruder by Huang and Brown (Polymer, 1992, 33, 2989-2997). However, although the UHMW polyethylene particles were found to be well bonded in the matrix and this helped to slow down the rate of crack propagation, when analysed under SEM, the UHMW polyethylene was found to remain in large separate domains with no evidence of "melting" into the HDPE matrix. For these reasons, the amount of UHMW polyethylene is limited to low loadings.

In WO 94/28064, polyethylene compositions are reported comprising a UHMW component and unimodal HDPE component.

As revealed hereinbefore mixing high molecular weight component into the low molecular weight component may increase risks for compatibility problems, typically when the molecular weight of the high molecular weight component is very high or especially when the molecular weight is tending to ultra-high grade. It is difficult to homogenize the ultra-high or even very high molecular weight particles into the polymer matrix. Frequently more than two polymer fractions with different molecular weights are mixed causing problems when the molecular weights of components vary a lot. Polymer components with different molecular weights do not form homogeneous compositions due to increased viscosity ratio between these components, and therefore separate particles exist in the composition. These particles comprise very high or ultra-high molecular weight components. Particles are called "white spots", which may occur in the compounded material e. g. when producing pipes. A size of these white spots is usually below 10 to about 50 micrometer. The very high or ultra-high molecular weight components may also form gel particles with a size of about 0.01 to 1 mm when compounding polymer compositions e.g. for the production of films. Non-homogeneous compositions adversely affect mechanical properties of polymer compositions and may cause roughness of surfaces of articles. To improve homogeneity mixing of components has been used, but it may be difficult to get a product with sufficient homogeneity and may be uneconomical.

Also after extrusion but before cooling articles like pipes comprising polymer tend to flow from above downwards due to gravity flow with the result that a thickness of polymer layer is thinner in a top part of the article compared to a lowest part. This phenomenon is frequently called "sagging" and is undesirable. Multimodal polymers can be used to manufacture articles having various features depending on e.g. an application and circumstances. Articles can be for instance films, fibres, cable sheathings, pipes and fittings. Pipes made from polymer compositions have many purposes of use, such as to transport liquids or gas. Typically pipes must be able to withstand pressure, because liquids or gas usually are pressurised. Polymer compositions comprising polyethylenes are nowadays frequently used for manufacturing pipes. Such polymer compositions may comprise e.g. two or more polyethylene fractions with different weight average molecular weights, frequently called multimodal and they have good chemical and physical properties. Fractions may contain ethylene homo- or copolymers. The content of comonomer can be varied as well as the type of the comonomer, which usually is alpha-olefin comonomer. The composition of each of the fractions as well as the relative proportions between fractions has significant influence on the properties of the multimodal composition. Furthermore, the polymerisation conditions, e.g. reactor types, reactant concentrations and the type of the polymerisation catalyst have a remarkable influence on properties of fractions.

EP 1655334B1 discloses a multimodal polyethylene composition comprising three ethylene homo- or copolymer fractions, which are an ultrahigh molecular weight fraction (A), a fraction (B) having lower molecular weight than fraction (C) and fraction (C) having a lower weight average molecular weight than fraction (A). With this composition improved homogeneity after a production and improved surface properties were obtained. In accordance with an example the composition has an Eta 747 of 675 kPas, MFR5 of 0.2 g/10 min and white spot area of 0.4%. White spot rating test of the composition was 3.3.

EP1655337B1 discloses a bimodal polyethylene composition comprising a first ethylene homo- or copolymer fraction (A) and a second ethylene homo- or copolymer fraction (B), when fraction (A) has a lower molecular weight than fraction (B). Also in this case improved homogeneity and surface properties were obtained. In accordance with the examples the FRR21/5 of the compositions varied from 33.5 and 40.5, and the white spot rating varied from 2.7 to 4.2. White spot area of the composition was from 0.08 to 0.5% and the MFR5 from 0.20 to 0.26 g/10 min.

EP 3037469 and WO 2016/102062 disclose a process for producing a multimodal polyethylene composition by blending a first polyethylene fraction having a viscosity average molecular weight Mv of 700 to 10.000 kg/mol and another polyethylene fraction having a lower Mw than the first fraction. After that this combined blend is further blended with a third polyethylene resin having a Mw of 50 to 700 kg/mol to form the multimodal polyethylene composition having a melt flow rate MFR5 of 0.01 to 10.0 g/min and a density of 910 to 970 kg/m$^3$. The amount of ultra-high molecular weight component of the first fraction in examples is either 10 wt % or 20 wt % of the total composition.

There is need to have multimodal compositions, based on which articles with improved properties e.g. surface properties can be produced without adversely affecting a short term pressure resistance. Improved surface properties require tolerable homogeneity of the composition. Also improved processability and mechanical properties of the composition is an advantage. Further it is desirable to reduce gravity flow of a polymer composition especially when extruding articles like pipes. The sagging resistance is the property to withstand this tendency, which can be determined by measuring a viscosity of a polymer at a very low, constant shear stress of 747 Pa (eta$_{747}$) at temperature of 190° C. Typically the greater the viscosity the lower the gravity flow. Therefore the composition exhibiting high viscosity enough is advisable. The composition may comprise polyethylene components of various molecular weights for improving these various properties.

BRIEF DESCRIPTION OF THE INVENTION

The deficiencies, drawbacks and problems mentioned above are addressed herein and can be understood by reading the detailed account.

In an embodiment of the present invention, a polymer composition comprising a base resin includes at least three polymer components, which are a very high molecular weight polyethylene component as fraction A1, a low molecular weight polyethylene component as fraction A2 having a weight average molecular weight lower than a weight average molecular weight of the very high molecular weight polyethylene component, and a high molecular weight polyethylene component as fraction A3 having a weight average molecular weight higher than the weight average molecular weight of the low molecular weight polyethylene component but lower than the weight average molecular weight of the very high molecular weight component. An amount of the very high molecular weight polyethylene component in the base resin is 0.5 to 8 wt %, and a viscosity average molecular weight (Mv) of the very high molecular weight polyethylene component is greater than 1100 kg/mol. The composition has FRR21/5 of equal to or greater than 38, a melt flow rate MFR$_{21}$ of equal to or greater than 6.5 g/10 min and a viscosity at a shear stress of 747 Pa (eta747) of 450 to 3000 kPas.

In another embodiment of the present invention, a process for the production of a polyethylene composition includes steps of polymerising ethylene and optionally at least one comonomer in the presence of a polymerisation catalyst to form a very high molecular weight polyethylene component of fraction A1, polymerising ethylene and optionally at least one comonomer in the presence of same or different polymerisation catalyst(s) as polymerising the very high molecular weight polyethylene component to form a low molecular weight polyethylene component of fraction A2 having a weight average molecular weight lower than a weight average molecular weight of the very high molecular weight polyethylene component, and polymerising ethylene and optionally at least one comonomer in the presence of same or different polymerisation catalyst(s) as polymerising the very high molecular weight polyethylene component to form a high molecular weight polyethylene component of fraction A3 having a weight average molecular weight higher than the weight average molecular weight of the low molecular weight polyethylene component but lower than the weight average molecular weight of the very high molecular weight component. An amount of the very high molecular weight polyethylene component in the base resin is 0.5 to 8 wt %. The very high molecular weight polyethylene component of fraction A1 has a viscosity average molecular weight (Mv) of greater than 1100 kg/mol. The composition has FRR21/5 of equal to or greater than 38, a melt flow rate MFR$_{21}$ of equal to or greater than 6.5 g/10 min and a viscosity at a shear stress of 747 Pa (eta747) of 450 to 3000 kPas.

In yet another embodiment, the present invention provides an article, such as a pipe or fitting, made of the polyethylene composition as hereinbefore described.

In yet another embodiment, the present invention provides a use of the polyethylene composition for the production of the article as hereinbefore defined.

DETAILED DESCRIPTION OF THE INVENTION

The following detailed description includes specific embodiments, which should not limit the scope of the invention and the embodiments can be modified as set forth in the claims.

The embodiment applies to a polyethylene composition and a process for the production of the polyethylene composition, which can be used to make articles especially pipes and fittings, but not forgetting films, fibres and cable sheathings.

In the context of the present application the term fraction denotes a polymer component which has been produced in the presence of one polymerisation catalyst in one set of polymerisation conditions. Thereby three fractions may be produced by polymerising ethylene in three cascaded polymerisation reactors wherein the reactors are operated in different polymerisation conditions resulting in different molecular weights and/or comonomer contents of the polymer. Again, three fractions having different molecular weights and/or comonomer contents are produced, one of those fractions may be a prepolymer fraction.

The polyethylene composition comprises a base resin comprising only a polymeric material including at least three different polyethylene component fractions called herein fraction A1, A2 and fraction A3. Usually all polymer material of the polyethylene components is included in the base resin. Typically the amount of polymeric components or base resin is at least 90 wt % of the total polyethylene composition. The polyethylene composition may also comprise various additives, such as pigments, stabilizers (antioxidant agents), antacids and/or anti-UVs, antistatic agents and utilization agents (such as processing aid agents). Preferably the amount of these additives is 10 wt % or below, further preferred 8 wt % or below, still more preferred 4 wt % or below of the total composition. Preferably, the composition comprises carbon black in an amount of 8 wt % or below, further preferred of 1 to 4 wt %, of the total composition. Carbon black can be added to the composition by any suitable means, preferably in the form of master batch including carbon black in an amount of more than 10 wt % of that master batch. Further preferred the amount of additives different from carbon black is 1.5 wt % or less, more preferably 1.0 wt % or less, most preferably 0.5 wt % or less.

Each fraction may have been produced under different polymerisation conditions, the polymer component of fraction A1 in a first polymerisation stage in a first reactor, the polymer component of fraction A2 in a second polymerisation stage in a second reactor, and the polymer component of fraction A3 in a third polymerisation stage in a third reactor resulting in different weight average molecular weights and molecular weight distributions. Typically the same polymerisation catalyst may be used in these three reactors. Also it is possible to produce under same polymerisation condition in the same reactor with bimodal catalyst two polymer components. Naturally more than three reactors can be used, too. Further fractions A1, A2 and A3 may be mixed to produce the polyethylene base resin.

The polymer component of fraction A1, preferably a prepolymer fraction, is a very high molecular weight polyethylene component, fraction A2 may be a low molecular weight polyethylene component having a weight average molecular weight lower than the very high molecular weight polyethylene component and fraction A3 may be a high molecular weight polyethylene component having a weight average molecular weight higher than the low molecular weight polyethylene component but lower than the weight average molecular weight of the very high molecular weight component. If desired, the very high molecular weight polyethylene component may comprise, or even consists of, ultra-high molecular weight polyethylene components.

The composition or the base resin comprising more than one fraction is called "multimodal". If the multimodal composition comprises two fractions, it is called "bimodal" and correspondingly if it comprises three fractions, it is called "trimodal". In this specific case the composition or base resin may be trimodal, when the prepolymer fraction is included. The form of the molecular weight distribution curve, i.e. the appearance of the graph of the polymer weight fraction as function of its molecular weight, of such a multimodal polyethylene will show two or more maxima depending on the modality or at least be distinctly broadened in comparison with the curves for the individual fractions.

The very high molecular weight polyethylene component as fraction A1 is advantageously an ethylene homopolymer or optionally ethylene copolymer. The low molecular weight polyethylene component as fraction A2 is advantageously an ethylene homopolymer or optionally ethylene copolymer. The high molecular weight polyethylene component as fraction A3 may be an ethylene homopolymer or advantageously copolymer.

Ethylene homopolymer means a polymer which is formed essentially only repeated units deriving from ethylene. Homopolymers may, for example, comprise at least 99.9 wt % of repeat units deriving from ethylene. It is possible that minor traces of other monomers may be present as impurity.

The comonomer content of each fraction may vary, in case comonomer is present during polymerisation. Typically the comonomer content of the low molecular weight polyethylene component may be lower than the comonomer content of the high molecular weight polyethylene component. The comonomer content of the very high molecular weight polyethylene component may be higher than the comonomer content of the low molecular weight polyethylene component. As explained hereinbefore both the low molecular weight component and the very high molecular weight component are advantageously homopolymers. A polymerisable olefin is called a comonomer if the weight fraction of the units derived from the olefin in the copolymer is less than the weight fraction of the units derived from ethylene. Usually comonomers are selected from alpha-olefin comonomers with 3-20 carbon atoms, preferably 4-12 carbon atoms, more preferably 4-8 carbon atoms. Preferably the comonomer of the high molecular weight polyethylene component of fraction A3 is 1-hexene.

The amount of fraction A1, which may be the prepolymer fraction, in the base resin may be from 0.5-8 wt %, preferably from 1-7 wt %, more preferably 1.5-5 wt %.

The term molecular weight denotes herein the weight average molecular weight $M_w$. The very high molecular weight polyethylene component of fraction A1 may have a molecular weight $M_w$ of at least 700 kg/mol, preferably at least 800 kg/mol, more preferably at least 900 kg/mol. The very high molecular weight polyethylene component of fraction A1 may have a molecular weight $M_w$ of less than 2000 kg/mol, preferably less than 1700 kg/mol, more preferably less than 1500 kg/mol. Molecular weights were determined by GPC according to ISO 16014-1, 2, 4 and ASTM The number average molecular weight $M_n$ of the very high molecular weight polyethylene component of fraction A1 may be at least 150 kg/mol, preferably at least 200 kg/mol, more preferably at least 250 kg/mol. The number average molecular weight $M_n$ of the very high molecular weight polyethylene component of fraction A1 may be less than 600 kg/mol, preferably less than 500 kg/mol, more preferably less than 450 kg/mol. The number average molecular weights were determined by GPC according to ISO 16014-1, 2, 4 and ASTM D 6474-12.

The very high molecular weight polyethylene component of fraction A1 may have a Z average molecular weight $M_z$ at least 1500 kg/mol, preferably at least 1700 kg/mol, more preferably at least 1900 kg/mol. The very high molecular weight polyethylene component of fraction A1 may have a Z average molecular weight $M_z$ less than 4000 kg/mol, preferably less than 3500 kg/mol, more preferably less than 3000 kg/mol. The Z average molecular weights were determined by GPC according to ISO 16014-1, 2, 4 and ASTM D 6474-12.

The molecular weight distribution MWD can be calculated from the ratio of the weight average molecular weight and the number average molecular weight $M_w/M_n$. The very high molecular weight polyethylene component of fraction A1 may have $M_w/M_n$ of equal to or higher than 2.0, preferably equal to or higher than 2.5, more preferably equal to or higher than 3.0. The very high molecular weight polyethylene component may have $M_w/M_n$ of equal to or lower than 5.0, preferably equal to or lower than 4.5, more preferably equal to or lower than 4.0. This relatively narrow molecular weight distribution is desirable to meet advantages of the invention which can be achieved especially when using a suitable catalyst, such as Ziegler-Natta catalyst as described hereinafter.

The very high molecular weight polyethylene component of fraction A1 may have a viscosity average molecular weight $M_v$ greater than 1100 kg/mol, preferably greater than 1400 kg/mol, more preferably greater than 1700 kg/mol, calculated from its intrinsic viscosity according to ASTM D 4020-05. The very high molecular weight polyethylene component of fraction A1 may have a viscosity average molecular weight $M_v$ less than 4000 kg/mol, preferably less than 3600 kg/mol, more preferably less than 3200 kg/mol.

An intrinsic viscosity (IV) of the very high molecular weight polyethylene component of fraction A1 determined according to the ISO 1628-3 may be equal to or higher than 14.0 dl/g, preferably equal to or higher than 15 dl/g, more preferably equal to or higher than 15.5 dl/g. An intrinsic viscosity (IV) of the very high molecular weight polyethylene component of fraction A1 may be equal to or less than 20.0 dl/g, preferably equal to or less than 19.0 dl/g, more preferably equal to or less than 18.5 dl/g.

The amount of the low molecular weight polyethylene component of fraction A2 in the base resin according to the embodiment may be 30 to 70 wt %, preferably 35 to 65 wt %, more preferably 40 to 60 wt % by weight.

A melt flow rate $MFR_2$ of the mixture of fractions A1 and A2 determined according to ISO 1133 may be 170 to 280 g/10 min, preferably 180 to 270 g/10 min, more preferably 190 to 260 g/10 min. MFR is an indication of flowability, and hence the processability of the polymer. The higher the melt flow rate, the lower the viscosity of the polymer composition or the base resin.

A weight average molecular weight $M_w$ of the mixture of fractions A1 and A2 may be at least 70 kg/mol, preferably at least 80 kg/mol, more preferably at least 90 kg/mol determined by GPC according to ISO 16014-1, 2, 4 and ASTM D 6474-12.

The amount of fraction A3 in the base resin according to the embodiment may be 25 to 65 wt %, preferably 30 to 60 wt %, more preferably 40 to 55 wt %.

A density of the mixture of fractions A1, A2 and A3 forming a base resin determined according to ISO 1183/1872-2B may be equal to or less than 965 kg/m$^3$, preferably equal to or less than 960 kg/m$^3$, more preferably equal to or less than 955 kg/m$^3$. The density of the mixture of fractions A1, A2 and A3 is equal to or more than 930 kg/m$^3$, preferably equal to or more than 935 kg/m$^3$, more preferably equal to or more than 940 kg/m$^3$. The density range of the mixture of fractions A1, A2 and A3 may be 930 to 965 kg/m$^3$, preferably 935 to 960 kg/m$^3$, more preferably 940 to 955 kg/m$^3$.

A melt flow rate $MFR_5$ of the mixture of fractions A1, A2 and A3 forming the base resin determined according to ISO 1133 may be equal to or less than 0.30 g/10 min, preferably equal to or less than 0.25 g/10 min, more preferably equal to or less than 0.22 g/10 min. A melt flow rate $MFR_5$ range of the mixture of fractions A1, A2 and A3 forming the base resin determined according to ISO 1133 may be 0.05 to 0.30 g/10 min, preferably 0.09 to 0.25 g/10 min, more preferably 0.12 to 0.22 g/10 min. MFR is an indication of flowability, and hence the processability of the polymer. The higher the melt flow rate, the lower the viscosity of the base resin.

A melt flow rate $MFR_{21}$ range of the mixture of fractions A1, A2 and A3 forming the base resin determined according to ISO 1133 may be 3.5 to 12.0 g/10 min, preferably 4.5 to 10.0 g/10 min, more preferably 5.5 to 8.0 g/10 min.

A weight average molecular weight $M_w$ of the mixture of fractions A1, A2 and A3 forming the base resin may be at least 170 kg/mol, preferably at least 200 kg/mol, more preferably at least 220 kg/mol determined by GPC according to ISO 16014-1, 2, 4 and ASTM D 6474-12.

A density of the composition comprising fractions A1, A2 and A3, but also carbon black and optionally other additives as explained hereinbefore determined according to ISO 1183/1872-2B may be equal to or less than 975 kg/m$^3$, preferably equal to or less than 970 kg/m$^3$, more preferably equal to or less than 965 kg/m$^3$. The density of the composition is equal to or more than 945 kg/m$^3$, preferably equal to or more than 950 kg/m$^3$, more preferably equal to or more than 955 kg/m$^3$. The density range of the composition may be 945 to 975 kg/m$^3$, preferably 950 to 970 kg/m$^3$, more preferably 955 to 965 kg/m$^3$.

The composition may have a comonomer content derived from alpha-olefin comonomers with 3-20 carbon atoms, preferably with 3-12 carbon atoms, more preferably 6 carbon atoms of 0.1 to 1.0 mol %, preferably of 0.2 to 0.9 mol %, more preferably of 0.4 to 0.8 mol % measured using NMR.

A melt flow rate $MFR_5$ of the composition determined according to ISO 1133 may be equal to or less than 0.40 g/10 min, preferably equal to or less than 0.32 g/10 min, more preferably equal to or less than 0.25 g/10 min. The $MFR_5$ of the composition may be equal or higher than 0.10 g/10 min, preferably equal or higher than 0.13 g/10 min, more preferably equal to or higher than 0.16 g/10 min. The $MFR_5$ range of the polymer composition may be 0.10 to 0.40 g/10 min, preferably 0.13 to 0.32 g/10 min, more preferably 0.16 to 0.25 g/10 min. MFR is an indication of flowability, and hence the processability of the polymer. The higher the melt flow rate, the lower the viscosity of the polymer composition.

The composition may have a melt flow rate $MFR_{21}$ of equal to or less than 15.0 g/10 min, preferably equal to or less than 13.0 g/10 min, more preferably equal to or less than 11.0 g/10 min determined according to ISO 1133. The $MFR_{21}$ of the composition may be equal to or higher than 6.5 g/10 min, preferably equal to or higher than 7.0 g/10 min, more preferably equal to or higher than 7.5 g/10 min. The $MFR_{21}$ range of the composition may be 6.5 to 15.0 g/10 min, preferably 7.0 to 13.0 g/10 min, more preferably 7.5 to 11.0 g/10 min.

The polyethylene composition may have a flow rate ratio $FRR_{21/5}$, which is the ratio of $MFR_{21}$ and $MFR_5$ of equal to or less than 70, preferably equal to or less than 65, more preferably equal to or less than 60. The flow rate ratio $FRR_{21/5}$ may be equal to or more than 38, preferably equal to or more than 40, more preferably equal to or more than 42.

A good processability of the polyethylene composition is desirable especially for pipe applications. High molecular weight is needed for meeting the requirements of good pressure resistance at elevated temperatures and low creep; however, processing of such high molecular weight resins is more difficult. Improved processability is reached by multimodal design of the base resin. Therefore at least one lower molecular weight component as fraction A2 is needed for easier processability of the composition, while the very high molecular weight component as fraction A1 and the high molecular weight component as fraction A3 contribute to the mechanical strength of the composition.

The term molecular weight denotes herein the weight average molecular weight $M_w$. The polyethylene composition may have a molecular weight $M_w$ of at least 100 kg/mol, preferably at least 130 kg/mol, more preferably at least 150 kg/mol determined by GPC according to ISO 16014-1, 2, 4 and ASTM D 6474-12. The polyethylene composition may have a molecular weight $M_w$ of less than 700 kg/mol, preferably less than 600 kg/mol, more preferably less than 500 kg/mol.

The number average molecular weight $M_n$ of the polyethylene composition may be higher than 4 kg/mol, preferably higher than 5 kg/mol, more preferably higher than 6 kg/mol determined by GPC according to ISO 16014-1, 2, 4 and ASTM D 6474-12. The number average molecular weight $M_n$ of the polyethylene composition may be less than 14 kg/mol, preferably less than 13 kg/mol, more preferably less than 12 kg/mol.

The polyethylene composition may have a Z average molecular weight $M_z$ higher than 700 kg/mol, preferably higher than 900 kg/mol, more preferably higher than 1000 kg/mol determined by GPC according to ISO 16014-1, 2, 4 and ASTM D 6474-12. The $M_z$ value of the polyethylene composition may be less than 2200 kg/mol, preferably less than 2000 kg/mol, more preferably less than 1900 kg/mol. $M_z$ indicates the presence of the very high molecular weight fraction.

The molecular weight distribution MWD can be calculated as the ratio of the weight average molecular weight to the number average molecular weight $M_w/M_n$. The composition may have $M_w/M_n$ of equal to or less than 45, preferably equal to or less than 40, more preferably equal to or less than 35. The composition may have $M_w/M_n$ of equal to or greater than 10, preferably equal to or greater than 15, more preferably equal to or greater than 20.

The composition may have a polydispersity index PI of equal to or less than 6.0 $Pa^{-1}$, preferably equal to or less than 5.0 $Pa^{-1}$, more preferably equal to or less than 4.5 $Pa^{-1}$. The composition may have PI of equal to or greater than 1.0 $Pa^{-1}$, preferably equal to or greater than 2.0 $Pa^{-1}$, more preferably equal to or greater than 2.5 $Pa^{-1}$. The polydispersity index is a rheological measurement of the broadness of the molecular weight distribution curve.

The polyethylene composition may have a viscosity at shear stress of 747 Pa (eta747) of equal to or more than 450 kPas, preferably equal to or higher than 500 kPas, more preferably equal to or higher than 550 kPas. The high enough viscosity may be achieved when the composition comprises the very high molecular weight component; however, in order to ensure sufficient processability the amount of the low molecular weight component must then be kept at a sufficient level. It is therefore especially preferred that the base resin comprises from 40 to 60 wt % by weight of the low molecular weight fraction A2. The polyethylene composition may have a viscosity at shear stress of 747 Pa (eta747) of equal to or less than 3000 kPas, preferably equal to or less than 2500 kPas, more preferably equal to or less than 2000 kPas. The higher eta747 is, the lower is the sagging of the polyethylene composition. The high eta747 indicates the presence of high molecular weight polymer chains and also high $M_w$ and respectively the low eta747 indicates the presence of low molecular weight polymer chains and low $M_w$. The viscosity of the polymer at this shear stress is determined at a temperature of 190° C. and has been found to be inversely proportional to the gravity flow of the polymer, i.e. the greater the viscosity is, the lower is the gravity flow.

The polyethylene composition may have a complex viscosity at 0.05 rad/s $Eta_{0.05 rad/s}$ of 150 to 400 kPa·s, preferably of 160 to 300 kPa·s, more preferably of 170 to 250 kPa·s.

Also the polyethylene composition may have a complex viscosity at 300 rad/s $Eta_{300 rad/s}$ of 800 to 2000 Pa·s, preferably of 900 to 1800 Pa·s, more preferably of 950 to 1600 Pa·s.

The polyethylene composition has a white spot rating (WSR) of below 10, such as 4 to 10 more preferably of below 9, such as 5 to 9, even more preferably of below 8 such as 6 to 8 determined according to ISO 18553/2002-03-01. The white spot rating test is a measure for the homogeneity of a polyethylene composition and based on ISO 18553. When compounding polyethylene compositions e.g. for producing pipes, so-called "white spots" occur in the compounded material. These white spots usually have a size of below 10 to about 50 micrometer and consist of non-pigmented, high molecular weight polymer agglomerates/particles that have not been adequately dispersed in the composition. These inhomogeneities in polymer compositions may increase roughness of the surface of articles produced thereof. It is known that homogeneity of a multimodal polymer composition can be improved by applying multiple compounding steps and/or particular compounding conditions to the resin coming from the reactor. These measures, however, have the disadvantage that they are associated with a significant increase in production costs for the composition. Thus, the white spot rating of the composition according to the present invention is determined on the pellets after a single compounding step.

Carbon black dispersion in the composition is less than 1.5%, preferably less than 1.0% determined according to ISO 18553, too.

Oxidation Induction Time (OIT) is a test used to estimate a lifetime of the polymer composition. Ageing can be accelerated to determine the OIT according to ASTM-D3895, ISO/CD 11357 and EN 728 using a Differential Scanning calorimeter (DSC). The OIT of the polymer composition at 210° C. may be at least 20 minutes, preferably at least 25 minutes, more preferably at least 30 minutes.

The strain hardening modulus of the polyethylene composition is rather high, which is an indication of improved resistance to Slow Crack Growth (SCG). It is important for the lifetime of the pipe. The polyethylene composition has a strain hardening modulus of more than 50 MPa, preferably more than 60 MPa, more preferably more than 70 MPa.

In accordance with a short term pressure test (STPT) the failure time for the polyethylene composition measured according to ISO 1167-1:2006 at 80° C. and at 5.4 MPa may be at least 900 hours, preferably at least 1100 hours, more preferably at least 1300 hours. Further in accordance with a short term pressure test (STPT) the failure time for the polyethylene composition measured according to ISO 1167-1:2006 at 20° C. and at 12.0 MPa may be at least 900 hours, preferably at least 1100 hours, more preferably at least 1300 hours.

Catalyst

Catalyst component used in (co)polymerisation of ethylene in several inventive examples is Lynx 200, which is commercially available Ziegler-Natta catalyst manufactured and supplied by BASF Polymerisation The multimodal polyethylene composition may be produced in a multistage polymerisation process in the presence of Ziegler-Natta catalyst as hereinbefore defined. Ethylene and optionally alpha-olefin comonomers with 3-20 carbon atoms, preferably with 3-12 carbon atoms, have been polymerised in a process comprising at least three consecutive polymerisation stages including prepolymerisation stage. Each polymerisation stage may be conducted in a separate reactor. The polymerisation may be followed by a compounding step.

The base resin of the polyethylene composition may be polymerised in at least one slurry phase reactor, preferably two slurry phase reactors, and at least one gas phase reactor, preferably one gas phase reactor. The very high molecular weight polyethylene component of fraction A1, which may be a prepolymer fraction, and the low molecular weight polyethylene component of fraction A2 may be polymerised in a sequential slurry phase reactors, which are preferably loop reactors, and the high molecular weight polyethylene component of fraction A3 may be polymerised in a gas phase reactor. One of the loop reactors may be a pre-loop reactor for producing a relative small amount of the very high molecular weight polyethylene component. The pre-loop reactor is a smaller loop reactor advantageously mounted before the next loop reactor producing the low molecular weight polyethylene component. Typically the order is first two loop reactors and then the gas phase reactor, but as well the order when polymerising could be different. Typically the very high molecular weight component of fraction A1 is polymerised in the first reaction stage, the low molecular weight component of fraction A2 in the second reaction stage in the presence of the very high molecular weight component and the high molecular weight component of fraction A3 in the third reaction stage in the presence of fraction A1 and A2. The components from these reactors in series are mainly mixed, since fraction A1 is included when polymerising fraction A2 in the second stage and fractions A1 and A2 are included when polymerising fraction A3. The same polymerisation catalyst may be used in three reactors. Also it is possible to produce in the first, second or third reactor in the presence of two or three different polymerisation catalysts the polymer components of fraction A1, fraction A2 and fraction A3.

The purpose of the prepolymerisation is to polymerise a small amount of polymer onto the catalyst at a low temperature and/or a low monomer concentration. By prepolymerisation it is possible to improve the performance of the catalyst in slurry and/or modify the properties of the final polymer. The prepolymerisation is preferably conducted in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons.

The temperature in the prepolymerisation step is typically from 0 to 90° C., preferably from 20 to 80° C. and more preferably from 40 to 75° C. The pressure is not critical and is typically from 1 to 150 barg, preferably from 10 to 100 barg.

The amount of monomer is typically such that from about 0.1 to 1000 grams of monomer per one gram of solid catalyst component is polymerised in the prepolymerisation step. As the person skilled in the art knows, the catalyst particles recovered from a continuous prepolymerisation reactor do not all contain the same amount of prepolymer. Instead, each particle has its own characteristic amount which depends on the residence time of that particle in the prepolymerisation reactor. As some particles remain in the reactor for a relatively long time and some for a relatively short time, then also the amount of prepolymer on different particles is different and some individual particles may contain an amount of prepolymer which is outside the above limits. However, the average amount of prepolymer on the catalyst typically is within the limits specified above.

The molecular weight of the prepolymer may be controlled by hydrogen, if desired, as it is known in the art. In this case it is preferred not to feed hydrogen during the prepolymerisation step to increase the weight average molecular weight of the prepolymer component. Further, antistatic additive may be used to prevent the particles from adhering to each other or the walls of the reactor, as disclosed in WO-A-96/19503 and WO-A-96/32420.

The catalyst components are preferably all (separately or together) introduced to the prepolymerisation step. However, where the solid catalyst component and the cocatalyst can be fed separately it is possible that only a part of the cocatalyst is introduced into the prepolymerisation stage and the remaining part into subsequent polymerisation stages. Also in such cases it is necessary to introduce so much cocatalyst into the prepolymerisation stage that a sufficient polymerisation reaction is obtained therein.

The amount of hydrogen is very low, preferably no hydrogen is fed to produce the very high molecular weight polyethylene component. If comonomer is desired it may be needed to adjust the properties of the final multimodal polymer. The prepolymer may have one C3-C20 alpha olefin comonomer Further, typically the amount of the prepolymer is not more than about 15% by weight of the multimodal polymer comprising the prepolymer.

When polymerising the low molecular weight polyethylene component of fraction A2 in second slurry phase reactor hydrocarbon, such as ethane, propane, n-butane etc may be used as an inert diluent. Ethylene and optionally hydrogen and/or comonomer is introduced into the loop reactor to produce the low molecular weight polyethylene in the presence of Ziegler-Natta catalyst. To adjust the $MFR_2$ of the polyethylene hydrogen may be fed into the reactor. As in the first slurry phase reactor comonomer, if desired, may also be present in the second slurry phase reactor, which comonomer may be selected from at least one C3-C20 alpha olefin comonomer, typically comonomer is either 1-butene or 1-hexene. Advantageously comonomer may not be needed at all. Thus the low molecular weight polyethylene can be either homo or copolymer.

The ethylene content in the fluid phase of the slurry in the second slurry phase reactor may be from 0.5 to 15% by mole, preferably from 1 to 10% by mole, even more preferably from 2 to 8% by mole.

The molar ratio of hydrogen to ethylene in the second slurry phase reactor may be from 300 to 1200 mol/kmol, preferably from 400 to 1100 mol/kmol, more preferably from 500 to 1000 mol/kmol. The temperature in the second slurry phase reactor may be from 50 to 115° C., preferably from 60 to 110° C., more preferably from 70 to 105° C. The pressure may be from 10 to 150 barg, preferably from 30 to 110 barg, more preferably from 40 to 100 barg.

The slurry phase polymerisation in the first and second slurry phase reactors may be conducted in any known reactor suitable for slurry phase polymerisation, e.g. in a continuous stirred tank reactor or a loop reactor. Loop reactors suitable in the slurry phase polymerisation are generally known in the art e.g. in U.S. Pat. Nos. 4,582,816, 3,405,109, 3,324,093, EP-A-479186 and U.S. Pat. No. 5,391,654.

The slurry can be withdrawn from the slurry phase reactor either continuously or intermittently. A preferred way of intermittent withdrawal is the use of settling legs where the slurry is allowed to concentrate before withdrawing a batch of the concentrated slurry from the reactor. The use of settling legs is disclosed, amongst others, in U.S. Pat. Nos. 3,374,211, 3,242,150 and EP-A-1310295. Continuous withdrawal is disclosed e.g. in EP-A-891990, EP-A-1415999, EP-A-1591460 and WO-A-2007/025640. Continuous withdrawal may be combined with a suitable concentration method as disclosed in EP-A-1415999 and EP-A-1591460.

Settling legs are used to concentrate the slurry that is withdrawn from the reactor. The withdrawn stream thus contains more polymer per volume than the slurry within the reactor in average. This has the benefit that less liquid needs to be recycled back to the reactor and thereby the costs of the equipment are lower. In commercial scale plants the fluid which is withdrawn with the polymer evaporates in a flash tank and from there it is compressed with a compressor and recycled into a slurry phase reactor.

However, the settling legs withdraw the polymer intermittently. This causes the pressure and other variables in the reactor to fluctuate with the period of withdrawal. Also the withdrawal capacity is limited and depends on the size and number of settling legs. To overcome these disadvantages continuous withdrawal is often preferred.

The continuous withdrawal, on the other hand, has the problem that it typically withdraws the polymer in the same concentration as it is present within the reactor. To reduce the amount of hydrocarbons to be compressed the continuous outlet is advantageously combined with a suitable concentration device, such as hydrocyclone or sieve, as disclosed in EP-A-1415999 and EP-A-1591460. The polymer-rich stream is then directed to a flash and the polymer stream is returned directly into the reactor.

According to the embodiment from the first slurry phase reactor fraction A1 may be transferred to the second slurry phase reactor and from the second slurry phase reactor mixture of polymer fractions A1 and A2 may be transferred to a gas phase reactor. In a fluidised bed gas phase reactor an olefin is polymerised in the presence of Ziegler-Natta catalyst in an upwards moving gas stream. The fluidised bed may comprise the growing polymer particles including the active catalyst located above a fluidisation grid.

The polymer bed is fluidised with the help of a fluidisation gas comprising the olefin monomer, eventual comonomer(s), eventual chain growth controllers or chain transfer agents, such as hydrogen, and eventual inert gas used in the slurry phase reactor or inert gas can be different. The fluidisation gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP-A-684871.

From the inlet chamber the gas flow is passed upwards through a fluidisation grid into the fluidised bed. The purpose of the fluidisation grid is to divide the gas flow evenly through the cross-sectional area of the bed. Sometimes the fluidisation grid may be arranged to establish a gas stream to sweep along the reactor walls, as disclosed in WO-A-2005/087361. Other types of fluidisation grids are disclosed, among others, in U.S. Pat. No. 4,578,879, E-A-600414 and EP-A-721798. An overview is given in Geldart and Bayens: The Design of Distributors for Gas-fluidized Beds, Powder Technology, Vol. 42, 1985.

The fluidisation gas passes through the fluidised bed. The superficial velocity of the fluidisation gas must be higher than minimum fluidisation velocity of the particles contained in the fluidised bed, as otherwise no fluidisation would occur. On the other hand, the velocity of the gas should be lower than the onset velocity of pneumatic transport, as otherwise the whole bed would be entrained with the fluidisation gas. The minimum fluidisation velocity and the onset velocity of pneumatic transport can be calculated when the particle characteristics are known by using common engineering practise. An overview is given, among others in Geldart: Gas Fluidization Technology, J. Wiley & Sons, 1986.

When the fluidisation gas is contacted with the bed containing the active catalyst the reactive components of the gas, such as monomers and chain transfer agents, react in the presence of the catalyst to produce the polymer product. At the same time the gas is heated by the reaction heat.

The unreacted fluidisation gas is removed from the top of the reactor, compressed and recycled into the inlet chamber of the reactor. Prior to the entry into the reactor fresh reactants are introduced into the fluidisation gas stream to compensate for the losses caused by the reaction and product withdrawal. It is generally known to analyse the composition of the fluidisation gas and introduce the gas components to keep the composition constant. The actual composition is determined by the desired properties of the product and the catalyst used in the polymerisation.

After that the gas is cooled in a heat exchanger to remove the reaction heat. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerisable components, such as n-pentane, isopentane, n-butane or isobutene, which are at least partially condensed in the cooler.

The catalyst may be introduced into the reactor in various ways, either continuously or intermittently. Among others, WO-A-01/05845 and EP-A-499759 disclose such methods. Where the gas phase reactor is a part of a reactor cascade the catalyst is usually dispersed within the polymer particles from the preceding polymerisation stage. The polymer particles may be introduced into the gas phase reactor as disclosed in EP-A-1415999 and WO-A-00/26258.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

The top part of the gas phase reactor may include a so called disengagement zone. In such a zone the diameter of the reactor is increased to reduce the gas velocity and allow the particles that are carried from the bed with the fluidisation gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain time-averaged bed level.

Also antistatic agent(s) may be introduced into the gas phase reactor if needed. Suitable antistatic agents and methods to use them are disclosed, among others, in U.S. Pat. Nos. 5,026,795, 4,803,251, 4,532,311, 4,855,370 and EP-A-560035. They are usually polar compounds and include, among others, water, ketones, aldehydes and alcohols.

The reactor may also include a mechanical agitator to further facilitate mixing within the fluidised bed. An example of suitable agitator design is given in EP-A-707513.

To control the molecular weight of the high molecular weight polyethylene in gas phase polymerisation stage then hydrogen may be added to the gas phase reactor so that the molar ratio of hydrogen to ethylene may be from 1 to 150 mol/kmol, preferably from 3 to 100 mol/kmol, even more preferably from 5 to 60 mol/kmol. Comonomer, which is in this embodiment 1-hexene, may then be introduced into the gas phase polymerisation stage so that the molar ratio of comonomer to ethylene is from 5 to 200 mol/kmol, and preferably from 10 to 150 mol/kmol, even more preferably from 25 to 100 mol/kmol. In some embodiments comonomer may not be needed at all. The high molecular weight polyethylene component can be either homo or copolymer.

The ethylene content in the gas phase of the gas phase reactor may be from 1 to 50% by mole, preferably from 5 to 35% by mole, even more preferably from 7 to 20% by mole.

The temperature in the gas phase polymerisation may be from 65 to 105° C., preferably from 70 to 100° C., more preferably from 75 to 95° C. The pressure may be from 10 to 30 barg, preferably from 15 to 25 barg Extrusion When the polymer mixture has been removed from the polymerisation reactor it is subjected to process steps for removing residual hydrocarbons from the polymer. Such processes are well known in the art and can include pressure reduction steps, purging steps, stripping steps, extraction steps and so on. Also combinations of different steps are possible.

According to one preferred process a part of the hydrocarbons is removed from the polymer powder by reducing the pressure. The powder is then contacted with steam at a temperature of from 90 to 110° C. for a period of from 10 minutes to 3 hours. Thereafter the powder is purged with inert gas, such as nitrogen, over a period of from 1 to 60 minutes at a temperature of from 20 to 80° C.

According to another preferred process the polymer powder is subjected to a pressure reduction as described above. Thereafter it is purged with an inert gas, such as nitrogen, over a period of from 20 minutes to 5 hours at a temperature of from 50 to 90° C. The inert gas may contain from 0.0001 to 5%, preferably from 0.001 to 1%, by weight of components for deactivating the catalyst contained in the polymer, such as steam.

The purging steps are preferably conducted continuously in a settled moving bed. The polymer moves downwards as a plug flow and the purge gas, which is introduced to the bottom of the bed, flows upwards.

Suitable processes for removing hydrocarbons from polymer are disclosed in WO-A-02/088194, EP-A-683176, EP-A-372239, EP-A-47077 and GB-A-1272778.

After the removal of residual hydrocarbons the polymer is preferably mixed with additives as it is well known in the art. Such additives include antioxidants, process stabilisers, neutralisers, lubricating agents, nucleating agents, pigments and so on. Carbon black may be mentioned as a typical pigment. The polyethylene composition may comprise all these additives. The amount of base resin in the polyethylene composition may vary from 85 to 100 wt %, preferably from 90 to 100 wt %, more preferably from 95 to 100 wt %.

The polymer particles are mixed with additives and extruded to pellets as it is known in the art. Preferably a counter-rotating twin screw extruder is used for the extrusion step. Such extruders are manufactured, for instance, by Kobe and Japan Steel Works. A suitable example of such extruders is disclosed in EP-A-1600276. Typically the specific energy input (SEI) is during the extrusion within the range of from 180 to 250 kWh/ton. The melt temperature is typically from 220 to 290° C.

Methods

Oxidation Induction Time (OIT) Method

The oxidation induction time (OIT) at 210° C. was determined with a TA Instrument Q20 according to ISO11357-6. Calibration of the instrument was performed with Indium and Tin, according to ISO 11357-1. Each polymer sample (cylindrical geometry with a diameter of ca. 5 mm and thickness of 0.75 mm) was placed in an open aluminium crucible, heated from 25° C. to 200° C. at a rate of 20° C. min$^{-1}$ in nitrogen with a gas flow rate of 50 mL min$^{-1}$, and allowed to rest for 5 min before the atmosphere was switched to pure oxygen, also at a flow rate of 50 mL min$^{-1}$. The samples were maintained at constant temperature, and the exothermal heat associated with oxidation was recorded. The oxidation induction time was the time interval between the initiation of oxygen flow and the onset of the oxidative reaction. Each presented data point was the average of three independent measurements.

Melt Flow Rate

The melt flow rate (MFR) is determined according to ISO 1133 and is indicated in g/10 min. The MFR is an indication of the melt viscosity of the polymer. The MFR is determined at 190° C. for PE. The load under which the melt flow rate is determined is usually indicated as a subscript, for instance MFR$_2$ is measured under 2.16 kg load (condition D), MFR$_5$ is measured under 5 kg load (condition T) or MFR$_{21}$ is measured under 21.6 kg load (condition G).

The quantity FRR (flow rate ratio) is an indication of molecular weight distribution and denotes the ratio of flow rates at different loads. Thus, FRR$_{21/5}$ denotes the value of MFR$_{21}$/MFR$_5$.

Density

Density of the polymer was measured according to ISO 1183/1872-2B.

For the purpose of this invention the density of the blend can be calculated from the densities of the components according to:

$$\rho_b = \sum_i w_i \cdot \rho_i$$

where $\rho_b$ is the density of the blend,
$w_i$ is the weight fraction of component "i" in the blend and
$\rho_i$ is the density of the component "i".

Comonomer Content

Quantitative nuclear-magnetic resonance (NMR) spectroscopy was used to quantify the comonomer content of the polymers.

Quantitative $^{13}$C{$^1$H} NMR spectra recorded in the molten-state using a Bruker Advance III 500 NMR spectrometer operating at 500.13 and 125.76 MHz for $^1$H and $^{13}$C respectively. All spectra were recorded using a $^{13}$C optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. {klimke06, parkinson07, castignolles09} Standard single-pulse excitation was employed utilising the transient NOE at short recycle delays of 3 s {pollard04, klimke06} and the RS-HEPT decoupling scheme{fflillip05, griffin07}.

A total of 1024 (1k) transients were acquired per spectrum. This setup was chosen for high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (δ+) at 30.00 ppm {randall89}.

Characteristic signals corresponding to the incorporation of 1-hexene were observed (randall89) and all contents calculated with respect to all other monomers present in the polymer.

Characteristic signals resulting from isolated 1-hexene incorporation i.e. EEHEE comonomer sequences, were observed. Isolated 1-hexene incorporation was quantified using the integral of the signal at 38.29 ppm assigned to the *B4 sites, accounting for the number of reporting sites per comonomer:

$$H = I_{*B4}$$

With no other signals indicative of other comonomer sequences, i.e. consecutive comonomer incorporation, observed the total 1-hexene comonomer content was calculated based solely on the amount of isolated 1-hexene sequences:

$$H_{total} = H$$

Characteristic signals resulting from saturated end-groups were observed. The content of such saturated end-groups was quantified using the average of the integral of the signals at 22.84 and 32.23 ppm assigned to the 2 s and 3 s sites respectively:

$$S = (1/2)*(I_{S2} + I_{3S})$$

The relative content of ethylene was quantified using the integral of the bulk methylene (δ+) signals at 30.00 ppm:

$$E = (1/2)*I_{\delta+}$$

The total ethylene comonomer content was calculated based the bulk methylene signals and accounting for ethylene units present in other observed comonomer sequences or end-groups:

$$E_{total} = E + (5/2)*H + (3/2)*S$$

The total mole fraction of 1-hexene in the polymer was then calculated as:

$$fH = (H_{total}/(E_{total} + H_{total})$$

The total comonomer incorporation of 1-hexene in mole percent was calculated from the mole fraction in the usual manner:

$$H[\text{mol \%}] = 100*fH$$

The total comonomer incorporation of 1-hexene in weight percent was calculated from the mole fraction in the standard manner:

$$H[\text{wt \%}] = 100*(fH*84.16)/((fH*84.16)+((1-fH)*28.05))$$

klimke06

Klimke, K., Parkinson, M., Piel, C., Kaminsky, W., Spiess, H. W., Wilhelm, M., Macromol. Chem. Phys. 2006; 207:382.

parkinson07

Parkinson, M., Klimke, K., Spiess, H. W., Wilhelm, M., Macromol. Chem. Phys. 2007; 208:2128.

pollard04

Pollard, M., Klimke, K., Graf, R., Spiess, H. W., Wilhelm, M., Sperber, O., Piel, C., Kaminsky, W., Macromolecules 2004; 37:813.

filip05

Filip, X., Tripon, C., Filip, C., J. Mag. Resn. 2005, 176, 239 griffin07

Griffin, J. M., Tripon, C., Samoson, A., Filip, C., and Brown, S. P., Mag. Res. in Chem. 2007 45, S1, S198 castignolles09

Castignolles, P., Graf, R., Parkinson, M., Wilhelm, M., Gaborieau, M., Polymer 50 (2009) 2373 randall89

J. Randall, Macromol. Sci., Rev. Macromol. Chem. Phys. 1989, C29, 201.

Molecular Weight Averages, Molecular Weight Distribution ($M_n$, $M_w$, $M_z$, MWD)

Molecular weight averages ($M_z$, $M_w$ and $M_n$), Molecular weight distribution (MWD) and its broadness, described by polydispersity index, PDI=$M_w/M_n$ (wherein $M_n$ is the number average molecular weight and $M_w$ is the weight average molecular weight) were determined by Gel Permeation Chromatography (GPC) according to ISO 16014-1:2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i / M_i)} \quad (1)$$

$$M_w = \frac{\sum_{i=1}^{N} (A_i \times M_i)}{\sum_{i=1}^{N} A_i} \quad (2)$$

$$M_z = \frac{\sum_{i=1}^{N} (A_i \times M_i^2)}{\sum_{i=1}^{N} (A_i \times M_i)} \quad (3)$$

For a constant elution volume interval $\Delta V_i$, where $A_i$, and $M_i$ are the chromatographic peak slice area and polyolefin molecular weight ($M_w$), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain) or differential refractometer (RI) from Agilent Technologies, equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 μL of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0.5 kg/mol to 11,500 kg/mol. The PS standards were dissolved at room temperature over several hours. The conversion of the polystyrene peak molecular weight to polyolefin molecular weights is accomplished by using the Mark Houwink equation and the following Mark Houwink constants:

$K_{PS}=19\times10^{-3}$ mL/g, $\alpha_{PS}=0.655$ $K_{PE}=39\times10^{-3}$ mL/g, $\alpha_{PE}=0.725$ $K_{PP}=19\times10^{-3}$ mL/g, $\alpha_{PP}=0.725$ A third order polynomial fit was used to fit the calibration data.

All samples were prepared in the concentration range of 0.5-1 mg/ml and dissolved at 160° C. for 2.5 hours for PP or 3 hours for PE under continuous gentle shaking.

Nominal Viscosity Molecular Weight

Nominal viscosity molecular weight is calculated from the intrinsic viscosity [η] according to ASTM D 4020-05

$M_v=5.37\times10^4\times[\eta]^{1.37}$

Short Term Pressure Test (STPT)

The pressure test on un-notched 32 mm SDR 11 pipes having a length of 450 mm is carried out in water-inside and water-outside environment according to ISO 1167-1:2006. End caps type A were used. The time to failure is determined in hours. A hoop stress of 12 MPa and a temperature 20° C. as well as a hoop stress of 5.4 MPa and a temperature of 80° C. were applied.

Strain Hardening Modulus

Strain hardening modulus of the compounds was obtained from a tensile stress-strain curve above the natural draw ratio and represents the slope of the increase in the stress-strain trend at very high strains (the strain hardening regime). It was measured at 80° C. and 20 mm/min on preconditioned (120° C./1 h) 300 μm thick specimens according to ISO 18488.

White Spot Rating

A sample of the composition (including a pigment to make the inhomogeneities visible, i.e. carbon black) is obtained after the compounding step. Microtome cuts with a thickness of about 10 μm were made from 6 pellets of the respective sample perpendicular to extrusion direction. The microtome cuts were characterized by light microscopy (ZEISS microscope Axioimager) to get white spot rating according to ISO 18553. The lower the composition is rated the better is the homogeneity of the composition. The carbon black dispersion is also determined according to ISO 18553.

Rheology

The characterization of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates, using nitrogen atmosphere and setting a strain within the linear viscoelastic regime. The oscillatory shear tests were done at T 190° C. applying a frequency range between 0.01 and 600 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t)=\gamma_0\sin(\omega t) \quad (1)$$

If the applied strain is within the linear viscoelastic regime, the resulting sinusoidal stress response can be given by $$\sigma(t)=\sigma_0\sin(\omega t+\delta) \quad (2)$$

where $\sigma_0$ and $\gamma_0$ are the stress and strain amplitudes, respectively ω is the angular frequency δ is the phase shift (loss angle between applied strain and stress response)

t is the time

Dynamic test results are typically expressed by means of several different rheological functions, namely the shear storage modulus G', the shear loss modulus, G", the complex shear modulus, G*, the complex shear viscosity, η*, the dynamic shear viscosity, η', the out-of-phase component of the complex shear viscosity η' and the loss tangent, tan δ which can be expressed as follows:

$$G' = \frac{\sigma_0}{\gamma_0}\cos\delta[\text{Pa}] \quad (3)$$

$$G' = \frac{\sigma_0}{\gamma_0}\sin\delta[\text{Pa}] \quad (4)$$

$$G^* = G' + iG''[\text{Pa}] \quad (5)$$

$$\eta^* = \eta' + i\eta''[\text{Pa}\cdot\text{s}] \quad (6)$$

$$\eta' = \frac{G''}{\omega}[\text{Pa}\cdot\text{s}] \quad (7)$$

$$\eta'' = \frac{G''}{\omega}[\text{Pa}\cdot\text{s}] \quad (8)$$

The values of storage modulus (G'), loss modulus (G"), complex modulus (G*) and complex viscosity (η*) were obtained as a function of frequency (ω). Thereby, e.g. $\eta^*_{0.05\ rad/s}$ (eta*$_{0.05\ rad/s}$) is used as abbreviation for the complex viscosity at the frequency of 0.05 rad/s or $\eta^*_{300\ rad/s}$ (eta*$_{300\ rad/s}$) is used as abbreviation for the complex viscosity at the frequency of 300 rad/s.

The values are determined by means of a single point interpolation procedure, as defined by Rheoplus software. In situations for which a given G* value is not experimentally reached, the value is determined by means of an extrapolation, using the same procedure as before. In both cases (interpolation or extrapolation), the option from Rheoplus "Interpolate y-values to x-values from parameter" and the "logarithmic interpolation type" were applied.

Rheological Polydispersity Index PI

The polydispersity index, PI, is defined by equation:

$$PI = \frac{10^5}{G'(\omega_{COP})}, \omega_{COP} = \omega \text{ for } (G' = G'')$$

where, $\omega_{COP}$ is the cross-over angular frequency, determined as the angular frequency for which the storage modulus, G' equals the loss modulus, G".

Rheological Parameter Eta 747:

One method which correlates well with the sagging properties, and is used in connection with the present invention relates to the rheology of the polymer and is based on determination of the viscosity of the polymer at a very low, constant shear stress. A shear stress of 747 Pa has been selected for this method. The viscosity of the polymer at this shear stress is determined at a temperature of 190° C. and has been found to be inversely proportional to the gravity flow of the polymer, i.e. the greater the viscosity the lower the gravity flow.

The determination of the viscosity at 747 Pa shear stress is made by using a rotational rheometer, which can be a constant stress rheometer as for example an Anton Paar MCR Series Rheometer. Rheometers and their function have been described in "Encyclopedia of Polymer Science and Engineering", 2nd Ed., Vol. 14, pp. 492-509. The measurements are performed under a constant shear stress between two 25 mm diameter plates (constant rotation direction). The gap between the plates is 1.2 mm. A 1.2 mm thick polymer sample is inserted between the plates.

The sample is temperature conditioned during 2 min before the measurement is started. The measurement is performed at 190° C. After temperature conditioning the measurement starts by applying the predetermined stress. The stress is maintained during 1800 s to let the system approach steady state conditions. After this time the measurement starts and the viscosity is calculated.

The measurement principle is to apply a certain torque to the plate axis via a precision motor. This torque is then translated into a shear stress in the sample. This shear stress is kept constant. The rotational speed produced by the shear stress is recorded and used for the calculation of the viscosity of the sample.

Intrinsic Viscosity (IV) Measurement of Inventive Example

The reduced viscosity (also known as viscosity number), $\eta_{red}$, and intrinsic viscosity, $[\eta]$, of very high molecular weight polyethylene component are determined according to the principles of ISO 1628-3: "Determination of the viscosity of polymers in dilute solution using capillary viscometers".

Relative viscosities of a diluted polymer solution with concentration between 0.05-0.1 mg/ml and of the pure solvent (decahydronaphthalene stabilised with 200 ppm 2,6-bis(1,1-dimethylethyl)-4-methylphenol) are determined in an automated capillary viscometer (Lauda PVS1) equipped with 4 Ubbelohde capillaries placed in a thermostatic bath filled with silicone oil. The bath temperature is maintained at 135° C. Each measuring stand is equipped with electronics to control pump, valve function, time measurement, meniscus detection and has a magnetic stirrer. Polymer powder samples are pressed to compressed plaques using a hydraulic press (OMCl 10 t hydraulic press) at 190° C. at maximum pressure (10 t). The polymer powder is molten at 190° C. between 2-5 minutes. The compressed plaques or polymer granulates are directly placed into the capillary. The capillary is filled with the exact volume of solvent by use of an automatic pipette. The sample is dissolved with constant stirring until complete dissolution is achieved (typically within 300 min).

The efflux time of the polymer solution as well as of the pure solvent are measured several times until three consecutive readings do not differ for more than 0.2 s (standard deviation).

The relative viscosity of the polymer solution is determined as the ratio of averaged efflux times in seconds obtained for both, polymer solution and solvent:

$$\eta_{rel} = \frac{t_{solution} - t_{solvent}}{t_{solvent}} \text{[dimensionless]}$$

Reduced viscosity ($\eta_{red}$) is calculated using the equation:

$$\eta_{red} = \frac{t_{solution} - t_{solvent}}{t_{solvent} * C} \text{[dl/g]}$$

where C is the polymer solution concentration at 135° C.:

$$C = \frac{m}{V\gamma},$$

and m is the polymer mass, V is the solvent volume, and $\gamma$ is the ratio of solvent densities at 20° C. and 135° C. ($\gamma = \rho_{20}/\rho_{135} = 1.107$).

The calculation of intrinsic viscosity $[\eta]$ is performed by using the Schulz-Blaschke equation from the single concentration measurement:

$$\eta = \frac{\eta_{red}}{1 + K \cdot C \cdot \eta_{red}}$$

where K is a coefficient depending on the polymer structure and concentration. For calculation of the approximate value for $[\eta]$, K=0.27.

The corresponding Mv values are calculated using the following Mark Houwink equation:

$$Mv = 5.37 \times 10^4 [\eta]^{1.37}.$$

Intrinsic Viscosity (IV) Measurement for Comparative Example

The reduced viscosity (also known as viscosity number), $\eta_{red}$, and intrinsic viscosity, $[\eta]$, of polyethylenes (PE) are determined according to ISO 1628-3: "Determination of the viscosity of polymers in dilute solution using capillary viscometers".

Relative viscosities of a diluted polymer solution with concentration of 1 mg/ml and of the pure solvent (decahydronaphthalene stabilized with 200 ppm 2,6-bis(1,1-dimethylethyl)-4-methylphenol) are determined in an automated capillary viscometer (Lauda PVS1) equipped with 4 Ubbelohde capillaries placed in a thermostatic bath filled with silicone oil. The bath temperature is maintained at 135° C. The sample is dissolved with constant stirring until complete dissolution is achieved (typically within 90 min).

The rest of the measurement and calculation of intrinsic viscosity is done in a similar way as described for the Inventive Example.

Inventive Example 1

Prepolymer was prepared in a prepolymer loop reactor, which is also called herein first loop reactor, having a volume of 50 dm³ which was operated at a temperature of 50° C. and a pressure of 62.7 barg. Into the reactor were fed ethylene, so that the feed rate of ethylene was 1.5 kg/h, and propane was 52 kg/h. Also 5 g/h of a solid polymerisation catalyst component Lynx 200 as disclosed hereinbefore was introduced into the reactor. The estimated production rate was 1.2 kg/h. The temperature, pressure, ethylene feed, hydrogen feed, catalyst feed, production split, $M_n$, $M_w$, $M_z$, $M_w/M_n$, IV, $M_v$ and the complex viscosity ($\eta_{0.05}$) for the very high molecular weight component of most inventive examples are listed for the prepolymer fraction in Table 1. No comonomer was fed. The MFR$_5$ was not measurable.

A stream of slurry was continuously withdrawn and directed to a second loop reactor having a volume of 500 dm$^3$ and which was operated at a temperature of 95° C. and a pressure of 62.5 barg. Into the reactor were further fed additional ethylene, propane diluent and hydrogen so that the ethylene concentration in the fluid mixture was 3.4% by mole. No comonomer was fed. The fresh propane feed was 54 kg/h. The production rate was 30 kg/h. The temperature, pressure, H$_2$/C$_2$ ratio, production split, MFR$_2$ and M$_w$ for the low molecular weight component of fraction A2 produced in this second loop reactor including the polymer compositions of fraction A1 are listed in Table 1.

The slurry was withdrawn from the second loop reactor intermittently and directed to a flash vessel operated at a pressure of 21.3 barg. From there the polymer was directed to a fluidized bed gas phase reactor operated at a pressure of 21 barg and a temperature of 85° C. Additional ethylene, 1-hexene comonomer, nitrogen as inert gas and hydrogen were added so that the ethylene content in the fluid reaction mixture was 7.7 mol-%, the ratio of hydrogen to ethylene was 24 mol/kmol and the molar ratio of 1-hexene to ethylene was 70 mol/kmol. The polymer production rate in the gas phase reactor was 29 kg/h and thus the total polymer withdrawal rate from the gas phase reactor was about 60 kg/h. The ethylene copolymer of fraction A3 produced in this gas phase reactor including the polymer compositions of fraction A1 and A2 produced in the first and second loop reactors, which were withdrawn from the reactor, had a melt flow rate MFR$_5$ of 0.16 g/10 min, MFR$_{21}$ of 6.4 g/10 min, density of 948 kg/m$^3$ and the weight average molecular weight of 276.5 kg/mol The production split (weight-% 1$^{st}$ stage prepolymer/weight-% 2$^{nd}$ stage component/weight-% 3$^{rd}$ stage component) was 2/50/48. The temperature, pressure, H$_2$/C$_2$ ratio, the C$_6$ wt %, the production split, the density, MFR$_5$ and the MFR$_{21}$ of the polymer fraction A3 produced in this gas phase reactor including the polymer compositions of fraction A1 and A2 are listed in Table 1.

The polymer powder was mixed under nitrogen atmosphere with 722 ppm of Irganox 1010, 959 ppm of Irgafos 168 and 1.4 kg of carbon black. Then it was compounded and extruded under nitrogen atmosphere to pellets by using a CIMP90 extruder so that the SEI was 180 kWh/ton and the melt temperature 250° C. The following properties of the composition (pellets) are listed in Table 2: Comonomer content, density, MFR$_5$, MFR$_{21}$, FRR$_{21/5}$, Eta$_{747}$, Eta$_{0.05\ rad/s}$, Eta$_{300\ rad/s}$, PI, M$_n$, M$_w$, M$_z$, MWD, carbon black dispersion, white spot rating, OIT, strain hardening modulus, crack initiation and brittle failure.

Pipes with a diameter of 32 mm and a wall thickness of 3 mm were extruded on a Kraus Maffei 45 single screw extruder. It has 5 cylinder zones, 6 tool zones and 2 vacuumed water bath tanks. Pipe extrusion parameters measured for the pipes made of the polyethylene composition of the inventive example are shown in Table 3 as well as the results of the short term pressure test (STPT) measured according to ISO 1167-1:2006 at 80° C. and at 5.4 MPa and also at 20° C. and at 12.0 MPa.

Comparative Example 1

The catalyst in comparative example CE1 is same as in inventive example IE. Polymerisation included same steps as polymerisation of 1E1. The main difference compared to IE is the use of hydrogen during the prepolymerisation stage resulting to remarkably lower molecular weights of fraction A1. Instead during the third polymerisation stage in the gas phase reactor hydrogen feed was less than in the corresponding reaction stage of the inventive example resulting to higher molecular weights. Also the comonomer amount was slightly less than when polymerising the inventive example in the gas phase reactor. Reaction parameters and some properties are disclosed in Table 1.

The polymer powder was mixed under nitrogen atmosphere with 718 ppm of Irganox 1010, 878 ppm of Irgafos 168 and 2.0-2.5 wt % of carbon black. Then it was compounded and extruded Compounding step was same as when compounding the inventive example and also properties of the composition (pellets) of the comparative example are listed in Table 2.

Pipes with a diameter of 32 mm and a wall thickness of 3 mm were extruded on a Kraus Maffei 45 single screw extruder as explained when extruding pipes of the inventive example. Pipe extrusion parameters measured for the pipes made of the polyethylene composition of the comparative example are shown in Table 3 as well as the results of the short term pressure test (STPT) measured according to ISO 1167-1:2006 at 80° C. and at 5.4 MPa and also at 20° C. and at 12.0 MPa.

TABLE 1

|  | CE | IE |
|---|---|---|
| Prepolymerizer: | | |
| Temp (° C.) | 50 | 50 |
| Pressure (barg) | 62.7 | 62.7 |
| C$_2$ feed (kg/h) | 7.5 | 7.5 |
| H$_2$ feed (g/h) | 3 | 0 |
| Comonomer feed (g/h) | none | none |
| Catalyst feed (g/h) | 9 | 9 |
| Split (wt %) | 2 | 2 |
| MFR$_5$ (g/10 min) | 0.5 | Not measurable |
| M$_n$ (g/mol) | 17850 | 331000 |
| M$_w$ (g/mol) | 203000 | 1190000 |
| M$_z$ (g/mol) | 775500 | 2490000 |
| M$_w$/M$_n$ | 11.38 | 3.59 |
| IV (dl/g) | 3.9 | 17.4 |
| M$_v$ (g/mol) | 342877 | 2690954 |
| η$_{0.05}$(Pa · s) | 87510 | 12580000 |
| Loop: | | |
| Temp (° C.) | 95 | 95 |
| Pressure (barg) | 62.5 | 62.5 |
| H$_2$/C$_2$ (mol/kmol) | 800 | 800 |
| Comonomer/C2 (mol/kmol) | None | none |
| Split (wt %) | 50 | 50 |
| MFR$_2$ (g/10 min)* | 300 | 230 |
| M$_w$ (g/mol) | 37000 | 99000 |
| Gas phase: | CE | IE |
| Temp (° C.) | 85 | 85 |
| Pressure (barg) | 21.3 | 21.3 |
| H$_2$/C$_2$ (mol/kmol) | 20 | 22 |
| C6 wt % | 8.0 | 8.2 |
| Split (wt %) | 48 | 48 |
| Density (kg/m$^3$)* | 948.5 | 948.3 |
| MFR$_5$ (g/10 min)* | 0.21 | 0.16 |
| MFR$_{21}$ (g/10 min)* | 8.6 | 6.4 |
| M$_w$ (g/mol) | 292000 | 276500 |

*Density/MFR were average value from the QC test on powder samples.

TABLE 2

| PE Composition | CE | IE |
|---|---|---|
| C6 - wt % | 1.7 | 1.6 |
| Density (kg/m$^3$) | 960.5 | 961.4 |
| MFR$_5$ (g/10 min) | 0.25 | 0.20 |
| MFR$_{21}$ (g/m3) | 9.52 | 9.2 |
| FRR$_{21/5}$ | 38 | 46 |
| Comonomer (mol %) | 0.6 | 0.5 |
| Eta747 (Pa · s) | 458000 | 653000 |
| Eta$_{0.05\ rad/s}$ (Pa · s) | 170300 | 192400 |
| Eta$_{300\ rad/s}$ (Pa · s) | 1092 | 1116 |

TABLE 2-continued

| PE Composition | CE | IE |
|---|---|---|
| PI (Pa$^{-1}$) | 3.38 | 3.50 |
| $M_n$ (g/mol) | 8995 | 8355 |
| $M_w$ (g/mol) | 232000 | 236500 |
| $M_z$ (g/mol) | 1330000 | 1420000 |
| MWD | 25.78 | 23.84 |
| Carbon black dispersion (%) | 1.5 | 0.8 |
| White Spot Rating | 10.6 | 7.4 |
| OIT (210° C. - mins) | 34 | 34 |
| Strain Hardening Modulus (MPa) | 80 | 78 |
| CRB* - crack initiation (h) | 13 | 18 |
| CRB* - brittle failure (h) | 44 | 59 |

*Normalized to 12 MPa

TABLE 3

| | CE | IE |
|---|---|---|
| Pipe extrusion performance 32 mm SDR 11 (KM45) | | |
| Melt Temperature (° C.) | 219 | 219 |
| Melt pressure (bar) | 203 | 198 |
| Torgue (%) | 66 | 67 |
| Screw speed (rpm) | 157 | 152.6 |
| Output rate (kg/h) | 300 | 300 |
| Shrinkage (%) | 4.46 | 3.86 |
| Pipe surface rating (subjective) | Poor | OK |
| Pipe pressure testing | | |
| 12.0 MPa/20° C. (h) | 744 | >1500 |
| 12.0 MPa/20° C. (h) | 530 | >1500 |
| 12.0 MPa/20° C. (h) | 601 | 1539 |
| 5.4 MPa/80° C. (h) | 801 | >1500 |
| 5.4 MPa/80° C. (h) | >1500 | >1500 |
| 5.4 MPa/80° C. (h) | 1515 | >1500 |

It is apparent from the results of Table 3 that short term pressure tests of the inventive examples indicate significantly improved pressure resistances tested both at 12.0 MPa and 20° C. and at 5.4 MPa and 80° C. compared to the tests made with the comparative example. Also remarkable better pipe surface properties were achieved compared to the surface of the comparative example based on subjective tests. Further it is apparent from Table 2 that the inventive example showed significant improvement in brittle failure and crack initiation tests compared to the comparative example. The sagging resistance based on the viscosity of the polymer at a very low, constant shear stress of 747 Pa (eta$_{747}$) is remarkable advantage compared to the comparative example. One reason for advantageous properties of the whole composition as disclosed hereinbefore may be the very high molecular weight component of the prepolymer. This all means that the compositions of the inventive examples have significant advantages over the ones known in the art.

The written description includes examples of the invention to enable persons skilled in the art to produce and exploit the invention. However, the claims define the scope of protection, which may cover also other examples of the invention. Such examples may have elements that belong to the literal language of the claims or they are equivalent including only minor differences from the literal language of the claims.

The invention claimed is:

1. A polymer composition comprising a base resin which comprises at least three polymer components:
   (a) a very high molecular weight polyethylene component as fraction A1;
   (b) a low molecular weight polyethylene component as fraction A2 having a weight average molecular weight lower than a weight average molecular weight of the very high molecular weight polyethylene component; and
   (c) a high molecular weight polyethylene component as fraction A3 having a weight average molecular weight higher than the weight average molecular weight of the low molecular weight polyethylene component but lower than the weight average molecular weight of the very high molecular weight component,
   wherein:
   (I) an amount of the very high molecular weight polyethylene component in the base resin is 0.5 to 8 wt %, and a viscosity average molecular weight ($M_v$) of the very high molecular weight polyethylene component is greater than 1100 kg/mol;
   (II) the composition has FRR$_{21/5}$ of equal to or greater than 38, a melt flow rate MFR$_{21}$ of equal to or greater than 6.5 g/10 min, a viscosity at a shear stress of 747 Pa (eta747) of 450 to 3000 kPas, and a strain hardening modulus of more than 50 MPa; and
   (III) the composition has a hexene content of 0.1 to 1.0 mol %, measured using NMR.

2. A polyethylene composition according to claim 1, wherein the composition comprises carbon black in an amount of 8 wt % or below of the total composition.

3. A polyethylene composition according to claim 1, wherein:
   (i) an amount of the very high molecular weight polyethylene component in the base resin is 1 to 7 wt %, which very high molecular weight polyethylene component is an ethylene homopolymer or copolymer having at least one C3-C20 alpha olefin comonomer;
   (ii) an amount of the low molecular weight polyethylene component in the base resin is 30 to 70 wt %, which low molecular weight polyethylene component is an ethylene homopolymer or copolymer with at least one C3-C20 alpha olefin comonomer; and
   (iii) an amount of the high molecular weight polyethylene component in the base resin is 25 to 65 wt %, which high molecular weight polyethylene component is an ethylene homopolymer or copolymer with at least one C3-C20 alpha olefin comonomer.

4. A polyethylene composition according to claim 1, wherein the composition has a density of 945 to 975 kg/m$^3$.

5. A polyethylene composition according to claim 1, wherein the composition has MFR$_{21}$ of equal to or greater than 7.0 g/10 min.

6. A polyethylene composition according to claim 1, wherein the composition has MFR$_5$ of equal to or greater than 0.1 g/10 min.

7. A polyethylene composition according to claim 1, wherein the composition has FRR$_{21/5}$ of equal to or greater than 40.

8. A polyethylene composition according to claim 1, wherein the polyethylene composition has a viscosity at a shear stress of 747 Pa (eta747) of 500 to 2500 kPas.

9. A polyethylene composition according to claim 1, wherein a melt flow rate MFR$_5$ of the mixture of fractions A1, A2 and A3 forming the base resin determined according to ISO 1133 is equal to or less than 0.30 g/10 min.

10. A polyethylene composition according to claim 1, wherein the very high molecular weight polyethylene component of fraction A1 has a viscosity average molecular weight ($M_v$) of greater than 1400 kg/mol.

11. An article made of the polyethylene composition as defined in claim 1.

12. A process for the production of a polymer composition comprising a base resin, which comprises steps of:
    (a) polymerising ethylene and optionally at least one comonomer in the presence of a polymerisation catalyst to form a very high molecular weight polyethylene component of fraction A1; and
    (b) polymerising ethylene and optionally at least one comonomer in the presence of same or different polymerisation catalyst(s) as polymerising the very high molecular weight polyethylene component to form a low molecular weight polyethylene component of fraction A2 having a weight average molecular weight lower than a weight average molecular weight of the very high molecular weight polyethylene component; and
    (c) polymerising ethylene and optionally at least one comonomer in the presence of same or different polymerisation catalyst(s) as polymerising the very high molecular weight polyethylene component to form a high molecular weight polyethylene component of fraction A3 having a weight average molecular weight higher than the weight average molecular weight of the low molecular weight polyethylene component but lower than the weight average molecular weight of the very high molecular weight component, wherein
    (I) an amount of the very high molecular weight polyethylene component in the base resin is 0.5 to 8 wt %;
    (II) the very high molecular weight polyethylene component of fraction A1 has a viscosity average molecular weight ($M_v$) of greater than 1100 kg/mol;
    (III) the composition has $FRR_{21/5}$ of equal to or greater than 38, a melt flow rate $MFR_{21}$ of equal to or greater than 6.5 g/10 min, a viscosity at a shear stress of 747 Pa (eta747) of 450 to 3000 kPas, and a strain hardening modulus of more than 50 MPa; and
    (IV) the composition has a hexene content of 0.1 to 1.0 mol %, measured using NMR.

13. A process according to claim 12, wherein at least one of the catalyst(s) is a Ziegler-Natta (ZN) catalyst.

14. The process according to claim 12, wherein the composition has a white spot rating (WSR) determined according to ISO 18553 after a single compounding step of 5 to 10.

15. The polyethylene composition according to claim 1, wherein the composition has a white spot rating (WSR) determined according to ISO 18553 after a single compounding step of 5 to 10.

* * * * *